US011674932B2

(12) United States Patent
Van Der Heijden et al.

(10) Patent No.: US 11,674,932 B2
(45) Date of Patent: Jun. 13, 2023

(54) FLEXIBLE ULTRASONIC TRANSDUCER AND A TRANSDUCER BLOCK (71) Applicant: Röntgen Technische Dienst B.V., Rotterdam (NL)

(72) Inventors: Steven Johannes Van Der Heijden, Rotterdam (NL); Dheeradj Ramasaran, Rotterdam (NL); Cornelius Marinus Augustijn, Rotterdam (NL); Michiel Petrus Lambertus Engel, Rotterdam (NL)

(73) Assignee: Rontgen Technische Dienst B.V., Rotterdam (NL)

( * ) Notice: Subject to any disclaimer, the term of this patent is extended or adjusted under 35 U.S.C. 154(b) by 289 days.

(21) Appl. No.: 15/540,686

(22) PCT Filed: Dec. 28, 2015

(86) PCT No.: PCT/NL2015/050910
§ 371 (c)(1),
(2) Date: Jun. 29, 2017

(87) PCT Pub. No.: WO2016/108685
PCT Pub. Date: Jul. 7, 2016

(65) Prior Publication Data
US 2017/0363583 A1    Dec. 21, 2017

(30) Foreign Application Priority Data

Dec. 29, 2014   (NL) ...................................... 2014068
Dec. 31, 2014   (NL) ...................................... 2014080

(51) Int. Cl.
*G01N 29/24*     (2006.01)
*B06B 1/06*      (2006.01)
(Continued)

(52) U.S. Cl.
CPC ......... *G01N 29/245* (2013.01); *B06B 1/0644* (2013.01); *B06B 1/0648* (2013.01);
(Continued)

(58) Field of Classification Search
CPC .. G01H 29/245; B06B 1/0644; B06B 1/0662; B06B 1/0648; G01B 17/02; G01N 2291/02854
(Continued)

(56) References Cited

U.S. PATENT DOCUMENTS 2,761,076 A    8/1956   Hansell
2,875,354 A    2/1959   Harris
(Continued)

FOREIGN PATENT DOCUMENTS

CN    101712028 A        5/2010
EP    2858378 A1  *    4/2015    ............... H04R 1/44
(Continued)

OTHER PUBLICATIONS

International Search Report and Written Opinion issued in connection with corresponding PCT application PCT/NL2015/050910 dated Apr. 21, 2016.
(Continued)

*Primary Examiner* — Thomas M Dougherty
(74) *Attorney, Agent, or Firm* — Mintz Levin Cohn Ferris Glovsky and Popeo, P.C.

(57) ABSTRACT

A flexible ultrasonic transducer comprising a flexible metal plate, a piezoelectric ceramics element, a first electrical conductor and an insulation covering a portion of the metal plate. The metal plate comprises a first and a second outer surface opposite each other. The piezoelectric ceramics element is attached to the first outer surface, a first portion of the first outer surface is not covered with the piezoelectric ceramics element, and the first electrical conductor is attached to a first portion of the second outer surface or the first portion of the first outer surface. The first portion of the first outer surface and the first portion of the second outer surface have similar dimensions and positions and the (Continued)

insulation covering covers the first portion of the first outer surface so that the piezoelectric ceramics element is directly dry coupled an object to be inspected by means of the transducer.

22 Claims, 8 Drawing Sheets

(51) Int. Cl.
    *H01L 41/09*     (2006.01)
    *G01B 17/02*     (2006.01)

(52) U.S. Cl.
    CPC ............ *B06B 1/0662* (2013.01); *G01B 17/02* (2013.01); *G01N 2291/02854* (2013.01)

(58) Field of Classification Search
    USPC ................ 310/322, 324, 334, 336, 338, 348
    See application file for complete search history.

(56) References Cited

U.S. PATENT DOCUMENTS

| | | | | |
|---|---|---|---|---|
| 7,612,486 | B2* | 11/2009 | Yuuya | C08K 3/22 310/326 |
| 8,574,159 | B2* | 11/2013 | Kondoh | A61B 8/4281 310/311 |
| 2002/0007118 | A1* | 1/2002 | Adachi | B06B 1/0611 600/443 |
| 2009/0066192 | A1* | 3/2009 | Taki | B06B 1/0607 310/354 |
| 2011/0293922 | A1* | 12/2011 | Onoue | H05K 3/321 428/323 |
| 2012/0291554 | A1 | 11/2012 | Baba et al. | |
| 2014/0011240 | A1 | 1/2014 | Lipkens et al. | |
| 2014/0182382 | A1 | 7/2014 | Kruger | |
| 2014/0187956 | A1* | 7/2014 | Rice | B06B 1/0662 600/459 |
| 2015/0292927 | A1* | 10/2015 | Satou | G01F 1/66 73/861.29 |

FOREIGN PATENT DOCUMENTS

| | | | | |
|---|---|---|---|---|
| GB | 953340 A | | 3/1964 | |
| JP | 01252100 A | * | 10/1989 | ............ H04R 17/00 |
| JP | WO-2013183292 | * | 12/2013 | ............ H04R 17/00 |

OTHER PUBLICATIONS

Office Action and Search issued in connection with corresponding CN Application No. 201580077160.9 dated Nov. 27, 2018 (English Translation Not Available).

* cited by examiner

FLEXIBLE ULTRASONIC TRANSDUCER AND A TRANSDUCER BLOCK

FIELD OF INVENTION

Embodiments of the invention relates to a flexible ultrasonic transducer comprising a flexible metal plate, a piezoelectric ceramics element attached on the plate, a first electrical conductor such as a conductive wire which is electrically conductive attached to the plate and an insulation covering which covers at least a portion of the metal plate.

Embodiments of the invention also relates to a transducer block comprising a housing with a top side and a bottom side and a transducer as described above.

BACKGROUND TO THE INVENTION

Such systems are known as such.

In the oil, gas and power industries degradation due to corrosion and erosion is often the cause of integrity loss of the installation. This can lead to spills, production loss, pipeline failures, damage to environment or health and even loss of life. A substantial part of all maintenance costs is related to prevention, detection and repair of integrity loss.

Aging infrastructures in refineries and power plants can be subject to corrosion-induced failures, in some cases even without being reliably detected by current inspection campaigns, like manual ultrasonic wall thickness measurements. Such inspection campaigns are typically performed at long intervals (one or multiple years), have limited coverage (spot checks only) and have limited reliability (accuracy, human factor).

Especially the preparation for such inspection campaigns is substantial, to provide access to all parts (building of scaffoldings, removal of insulation) and often requires the installation to be shut down (because of high temperatures or other safety issues). Therefore, the industry is looking for reliable permanently mounted sensors & systems which can reliably and real-time report the integrity, like remaining wall thickness, at critical components, at high temperature and/or at difficult to access areas.

BRIEF DESCRIPTION

Embodiments of the invention provide a transducer which can meet these requirements.

The flexible ultrasonic transducer according to embodiments of the invention is characterized in that the metal plate comprises a first outer surface and a second outer surface lying opposite to each other side wherein the piezoelectric ceramics element is attached to the first outer surface wherein the dimensions of the first outer surface and the piezoelectric ceramics element are such that a first portion of the first outer surface is not covered with the piezoelectric ceramics element wherein the first electrical conductor is electrically conductive attached to at least one of a first portion of the second outer surface and the first portion of the first outer surface wherein the first portion of the first outer surface and the first portion of the second outer surface lie opposite each other and have about the same dimensions and positions in a plane wherein the metal plate extends and wherein at least a portion of the insulation covering covers the first portion of the first outer surface so that the a piezoelectric ceramics element is arranged to be directly dry coupled to a surface of an object to be inspected by means of the transducer. In general, it holds that if an electrical conductor is electrically conductive attached to an electrically conductive body this implies that the electrical conductor is electrically conductive connected with the body. The transducer can be used for submitting ultrasound into the object to be inspected and/or for receiving ultrasound from the object to be inspected, Typically the ultrasonic signals used for examination of a steel object, like wall thickness measurements, are in the megahertz frequency range (e.g. 1 to 10 MHz or 0.5 to 20 MHz). Ultrasonic waves at these frequencies propagate poorly through air therefore an ultrasonic coupling medium is used between the transducer and the object surface. Such a coupling medium can for example be a fluid like water, oil, grease or a gel. It is known that ultrasonic signals can be transferred between two surfaces without a coupling medium if an intimate bonding is created between those surfaces, e.g. by applying a very high pressure which is not practical.

Surprisingly the ultrasonic transducer in accordance with embodiments of the invention can be directly coupled to an object to be inspected by means of the transducer wherein the piezoelectric ceramics element is directly in contact with the outer surface of the object while applying a limited and practical pressure. It shows that the ultrasonic coupling between the piezoelectric ceramics element and the outer surface of the object can be sufficient for carrying out the required measurements by means of the ultrasonic transducer. The transducer can now be permanently connected under pressure to the object for permanently inspecting the object. Although there exists a dry-coupling between the piezoelectric ceramics element and the surface of the object, this coupling appears to be more than sufficient for obtaining reliable test results. It may even be that the piezoelectric ceramic element is slightly cracked but this appears to be not relEvant because there is no need to move or remove the transducer now the transducer is permanently attached to the object.

In such a measurement, the object itself forms an electrode for the piezoelectric ceramics element. Thus, for the application of the transducer according to embodiments of the invention it holds that the object or at least the object surface is electrically conductive.

Thus, the piezoelectric ceramics element is sandwiched between two electrodes wherein the first electrode is formed by the metal plate of the transducer and the second electrode is formed by the object itself. The insulation covering provides the required electrical insulation between the object on the one hand and the metal plate on the other hand.

Because moreover the electrical conductor is electrically conductive attached to the at least one of the first portion of the second outer surface and the first portion of the first outer surface, a homogeneous pressure can be applied to the metal plate so as to press the metal plate towards the surface of the object on a position where the piezoelectric ceramics element is sandwiched between the metal plate and the object. Such position is free of the attached electrical conductor because the attached electrical conductor is attached elsewhere to the metal plate. In accordance with embodiments of the invention the metal plate may in general have a thickness of about a thickness of about 25-100 micrometers (0.025-0.100 mms), in an embodiment about 50 micrometers (0.050 mms). In accordance with embodiments of the invention the piezoelectric ceramics element may in general have a thickness of 50-500 micrometers (0.050-0.500 mms), in an embodiment a thickness of 75-125 micrometers (0.075-0.125 mms). The resulting frequency may for example be about 5 MHz.

In an embodiment, it holds that the insulation covering also covers at least a second portion of the second outer surface wherein the first and second portion of the second outer surface do not overlap each other and together form the second outer surface and wherein in an embodiment also a portion of the second outer surface which surrounds the second portion of the second outer surface is covered by the covering and/or wherein in an embodiment also a portion of the first portion of the second outer surface is covered by the covering. In an embodiment the portion of the second outer surface which surrounds the second portion of the second outer surface and which is covered by the covering in an embodiment does not cover the full second outer surface if the first electrical conductor is attached to the second outer surface. Thus, it holds that if in an embodiment the first electrical conductor is attached to the first portion of the second outer surface than the second outer surface is not covered by the insulating covering at a position wherein the first electrical conductor is attached to the second outer surface.

In an embodiment, it holds that the insulating covering extends up to a circumferential edge of the piezoelectric ceramics element but does not substantially cover the circumferential edge of the piezoelectric ceramics element. In this way, it is guaranteed that the piezoelectric ceramics element can be in direct contact with the object surface and is not 'lifted' by the insulating covering. At the same time a gap between the insulating covering and the circumferential edge of the piezoelectric ceramics element shall in an embodiment be minimized to prevent that the first outer surface directly adjacent the (edge of the) piezoelectric ceramics element can come into contact with the surface of an object to be inspected by means of ultrasound. Please note that the thickness of the piezoelectric ceramics is in an embodiment substantially higher than the thickness of the insulating covering, which helps to prevent that the first outer surface directly adjacent the (edge of the) piezoelectric ceramics element can come into contact with the object surface. Optionally a suitable sealant can be used to fill the gap.

Alternatively, especially if the insulating covering is very thin, it in an embodiment holds that the insulating covering also covers a circumferential edge of the piezoelectric ceramics element. In this way, it is guaranteed that the first outer surface also directly adjacent the (edge of the) piezoelectric ceramics element is well covered by the insulating covering.

According to a special embodiment it holds that the transducer further comprises a metal electrode which is electrically isolated from the first metal plate wherein an outer surface of the metal electrode and the first outer surface of the first metal plate lie at least substantially in a same flat plane. In this embodiment, in use, the piezoelectric ceramics element is pressed against the surface of the object to be inspected wherein at the same time the metal electrode is pressed against the surface of the object to be inspected. In that case, it in an embodiment holds that the transducer comprises a second electrical conductor such as a conductive wire, which is electrically conductive connected with the metal electrode.

A transducer block according to embodiments of the invention is characterized in that it comprises a housing with a top side and a bottom side and a transducer of the type as discussed above wherein at least a portion of the second outer side of the transducer is attached to a first portion of the bottom side of the housing such that the first portion of the bottom side of the housing and the portion of the second outer surface of the transducer face each other. The transducer block can be used for submitting ultrasound into the object to be inspected and/or for receiving ultrasound from the object to be inspected, Because the transducer block is provided with the housing the transducer which is attached to the housing can be easily attached to an object to be inspected by pressing the housing towards the object, for example by means of a strip which surrounds the object to be inspected and clamps the transducer block and thereby the piezoelectric element onto the surface of the object to be inspected. The housing facilitates that the clamping forces on the piezoelectric element are homogeneously spread over a surface of the piezoelectric element.

In an embodiment, it holds that the metal electrode is formed by a second portion of the bottom side of the housing which is not covered by the second outer surface of the transducer. Thus, for the application of the transducer block according to embodiments of the invention it holds that in an embodiment the object or at least the object surface is electrically conductive. It further holds that in an embodiment the housing comprises a bore extending from the top side of the housing towards the transducer wherein at least the first electrical conductor extends through the bore. Optionally also a second electrical conductor such as a conductive wire, if present, is attached to the metal electrode and extends through the bore. In such a way, the electrical conductors cannot interfere with an object to be inspected.

It holds that in an embodiment the bore comprises a widened portion near an end of the bore at the bottom side of the transducer block. The widened portion can be used for holding the portion of the first electrical conductor which is electrically conductive attached to the second outer surface of the transducer. The attachment can for example be obtained by means of soldering so that there is sufficient space for the material required for the soldering.

In an embodiment, it holds that the transducer block is provided with an electrical connector at the top side of the housing wherein the first and second electrical conductors are electrically conductive connected to (and in an embodiment ends) with the connector. The connector may be a well-known standard connector.

In accordance with an embodiment whereby the transducer block is easy to manufacture it holds that the portion of the insulating covering which covers the portion of the second outer surface of the transducer is attached to and covers the first portion of the bottom side of the housing wherein in an embodiment this portion of the covering extends to and covers a sidewall of the housing. Similarly, it holds that in an embodiment a portion of the insulating covering which covers the first portion of the first outer surface of the transducer extends to and covers a sidewall of the housing.

In accordance with an embodiment it further holds that the top side of the housing is provided with a recess extending over a full width of the housing wherein a strip such as a metal band can be accommodated for attaching the transducer block to the object such that the piezoelectric ceramics element lies directly against an outer surface of the object in an embodiment without any intermediate medium so that there is a dry coupling between the piezoelectric ceramics element and the surface of the object wherein the strip extends around a circumference of the object. In this way, the transducer block can be easily attached to an object to be inspected by means of the strip which strip is clamped around the object.

Embodiments of the invention also relates to a method for attaching a single transducer block or a plurality of transducer blocks of the type as described above to an object to be inspected. The method comprises the following steps:

Attaching each individual transducer block to an individual positioning block such that it holds for each assembly of a transducer block and a positioning block that an outer surface of the piezoelectric ceramics element lies above a bottom surface of the positioning block;

After step a. for each assembly positioning a bottom of a positioning block of the assembly at a surface of the object wherein the positioning block of the assembly is attached to the object in such a way that the transducer block of the assembly is in its desired position above the surface of the object without contacting the surface of the object wherein a bottom side of the housing of the transducer block of the assembly faces the surface of the object;

After step b. for each assembly attaching the transducer block of the assembly to the object to be inspected in an embodiment by movement of the transducer block of the assembly relative to the positioning block of the assembly towards the surface so that the piezoelectric ceramics element of the transducer block of the assembly lies against the surface of the object to be inspected in an embodiment without any intermediate medium so that there is a dry coupling between the piezoelectric ceramics element of the transducers of the assembly and the surface of the object;

After step c. for each assembly removing the positioning block while maintaining the associated transducer block attached to the object.

Embodiments of the invention also relates to an alternative method for attaching a single transducer block or a plurality of transducer blocks of the type as described above to an object to be inspected. The method comprises the following steps:

for each transducer block positioning a bottom of a positioning block at a surface of the object wherein the positioning block is attached to the object in such a way that the resulting position of each transducer block in step f will be in its desired position above the surface of the object;

Attaching each individual transducer block to an individual positioning block such that it holds for each assembly of a transducer block and a positioning block which are attached to each other that an outer surface of the piezoelectric ceramics element is temporarily located above a bottom surface of the positioning block;

After step f. for each assembly attaching the transducer block of the assembly to the object to be inspected in an embodiment by movement of the transducer block of the assembly relative to the positioning block of the assembly towards the surface so that the piezoelectric ceramics element of the transducer block of the assembly lies against the surface of the object to be inspected in an embodiment without any intermediate medium so that there is a dry coupling between the piezoelectric ceramics element of the transducer of the assembly and the surface of the object;

After step g. for each assembly removing the associated positioning block while maintaining the transducer block attached to the object.

In these two ways, the positioning of the individual transducers on the object to be inspected can be carried out by means of positioning the positioning blocks wherein however the risk is avoided that the piezoelectric ceramics element comes in contact with a surface of the object during shifting the positioning blocks on the object towards the desired positions of the associated transducer blocks. This positioning is carried out in step b. or e. and can thus be carried out without the risk that the piezoelectric element is damaged. In an embodiment, it holds that in step b. or e. the positioning blocks are attached to the object by means of a strip such as a metal belt which extends around the circumference of the object and/or wherein in step c. or g. the transducer blocks are attached to the object by means of a strip such as a metal belt which extends around the circumference of the object.

Embodiments of the invention also relates to an assembly comprising a transducer as discussed above and a position block wherein the transducer block and the position block are detachably connected to each other wherein an outer surface of the piezoelectric ceramics element lies above an upper portion of the bottom surface of the positioning block lying adjacent the transducer block and wherein the transducer block and the positioning block are movable relative to each other in a direction perpendicular to the bottom side of the housing.

In an embodiment, it holds that the positioning block is provided with a recess extending over a full width of the positioning block at a top side of the positioning block for accommodating a strip.

BRIEF DESCRIPTION OF THE DRAWINGS

Embodiments of the invention will now be described by means of the drawings wherein:

FIG. 3B.1 shows a second step for the process for manufacturing the transducer block of FIG. 2;

FIG. 3B.2 shows a view of the intermediate product as shown in FIG. 3B.1 in a direction of the arrow P in FIG. 3B.1;

DETAILED DESCRIPTION

FIG. 1 shows a flexible ultrasonic transducer 1 in an embodiment. The transducer comprises a flexible metal plate 2. In accordance with embodiments of the invention the metal plate may in general have a thickness of about 50 micrometers (0.050 mms). In an embodiment, the metal plate has a thickness of about 25-100 micrometers (0.025-0.100 mms) however, this thickness is not very critical.

Figure 1A:
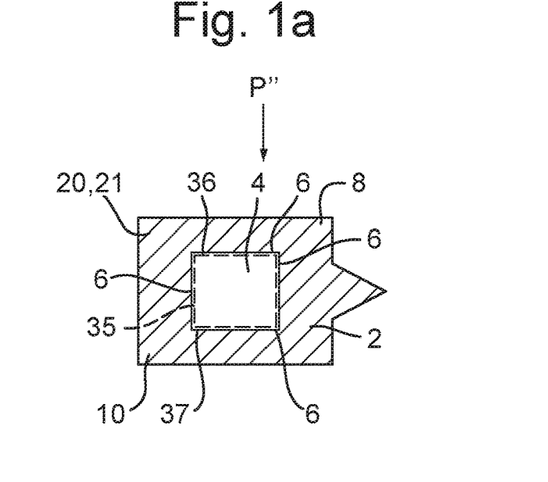
FIG. 1A shows a view in the direction of the arrow P in FIG. 1C of a transducer.

In this embodiment the transducer is further provided with a piezoelectric ceramics element 4 which is attached on the plate. The ceramic element may for example be applied to a first outer surface 8 of the metal plate by means of a sol-gel coating process such as is for example known from EP 0 815 285 A1. In accordance with embodiments of the invention the piezoelectric ceramics element may in general have a thickness of 50-500 micrometers (0.050-0.500 mms), in an embodiment a thickness of 75-125 micrometers (0.075-0.125 mms).

The dimensions of the first outer surface 8 and the piezoelectric ceramics element 4 are such that a first portion 10 of the first outer surface 8 is not covered with the piezoelectric ceramics element. In this example the first portion 10 is formed by the first outer surface minus that portion of the first outer surface which is covered by the element 4, which covered portion is well-defined by the edges 6 of the element 4 as shown in FIG. 1A.

Figure 1B:
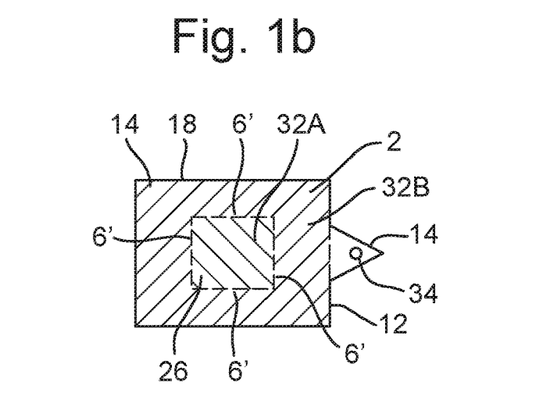
FIG. 1B shows a view in the direction of the arrow P' in FIG. 1C of the transducer according to FIG. 1A.

As shown in FIG. 1B, the metal plate is also provided with a second outer surface 12 wherein the first outer surface 8 and the second outer surface 12 lie opposite each other. An electrical conductor 15 such as a conductive wire is electrically conductive attached to a first portion 14 of the second outer surface. The first portion 14 of the second outer surface and the first portion 10 of the first outer surface 8 lie opposite each other and have about the same dimensions and position in a plane 16 (see FIG. 1D which is in fact an intermediate product because a insolating covering is not present)) wherein the metal plate 2 extends. In FIG. 1B the first portion 14 of the second surface has boundaries which are formed by the lines 6' on the one hand and the circumferential edge 18 of the metal plate on the other hand. Please note that the boundaries 6' correspond with the outer edges 6 of the piezoelectric element so that the outer edge 6 and the boundary 6' have the same dimensions.

In this example the flexible ultrasonic transducer is further provided with an insulation covering 20 having a portion 21 which covers the first portion 10 of the first outer surface 8 which portion 20 is shown in FIG. 1A.

Figure 1C:
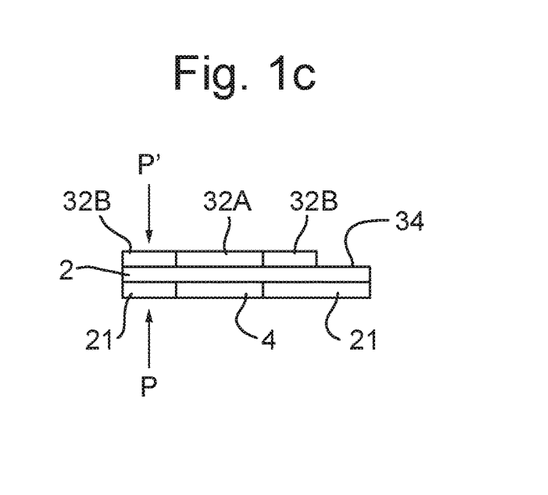
FIG. 1C shows a side view in the direction of the arrow P'' of FIG. 1A of the transducer of FIG. 1A.
Figure 1D:
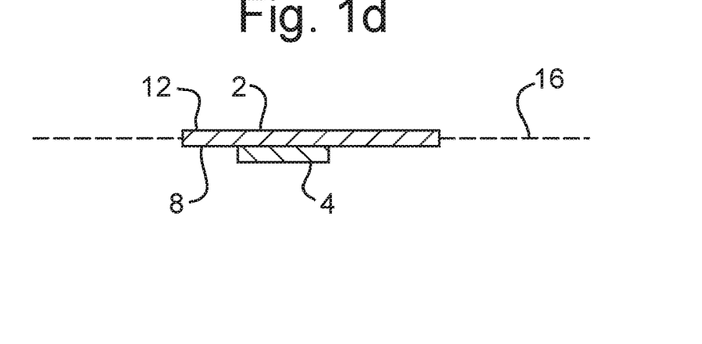
FIG. 1D shows the metal plate provided with the piezoelectric ceramics element attached to the plate of the transducer of FIG. 1A.
Figure 1E:
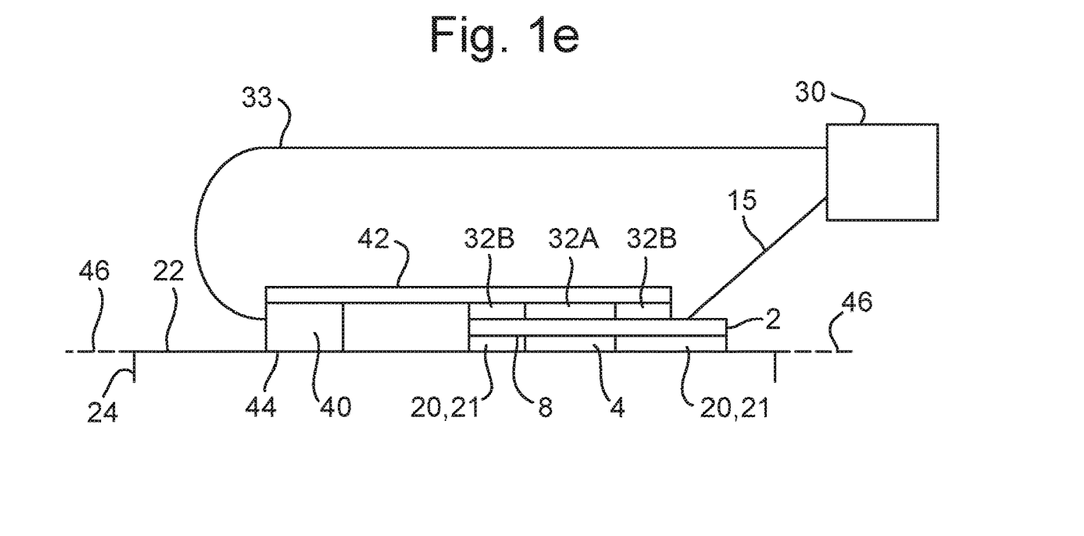
FIG. 1E shows the transducer of FIG. 1A provided with a metal electrode and in use.
Figure 1F:
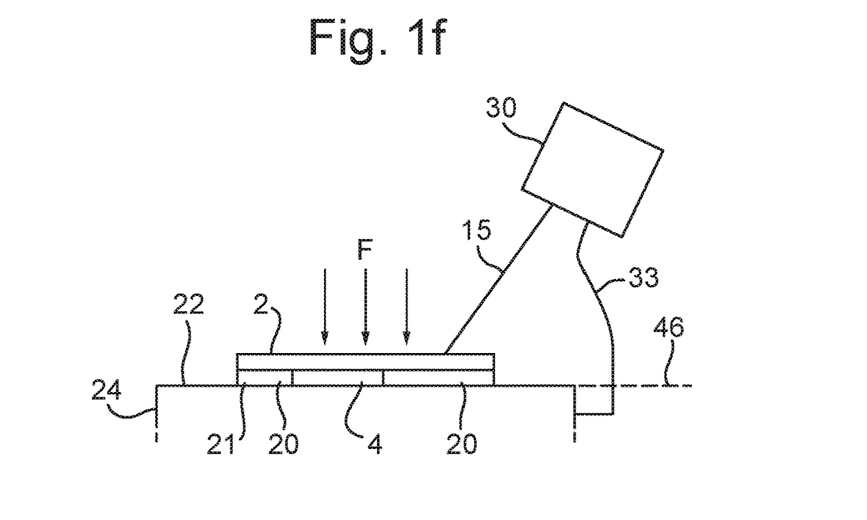
FIG. 1F shows a use of the transducer of FIG. 1C without the covering 32A, 32B.

The transducer which has been described up until this point can be easily attached to a surface 22 of an object 24 to be inspected as is shown in FIG. 1F Because an electrical conductor 15 is electrically conductive attached to the second outer surface 12 on the first portion 14 of the second outer surface, pressure can be easily applied to the metal plate 2 as indicated by arrows F in FIG. 1F so as to press the piezoelectric element 4 against the surface 22 of the object 24. The pressure which is indicated by the arrows F can be applied on a second portion 26 of the second outer surface 12 which lies within the boundaries 6' because the first conductor is attached to the second outer surface elsewhere. As shown in FIG. 1F the first electrical conductor 15 extends to a receiver and transmitter 30 which is well-known in the art. A second electrical conductor 33 extends from the receiver and transmitter 30 to the metal object 24. In such an appliance of the transducer 1 the piezoelectric element 4 is sandwiched between the metal plate 2 on the one hand and the surface 22 of the object 24 on the other hand so that the surface 22 of the object 24 on the one hand and the metal plate 2 on the other hand may each form an electrode between which the ceramic element 4 is sandwiched. The transducer may be permanently attached to the surface 22.

The piezoelectric element lies in direct contact with the surface 22 without in between a medium such as a gel. In accordance with a special embodiment of the transducer the portion of the insulating covering which covers the first outer surface 8 is attached to the first outer surface 8, for example by means of glue. In accordance with a special embodiment the insulation covering 20 also covers at least the second portion 26 of the second outer surface. This part of the insulation covering is indicated with reference number 32A in FIG. 1b. In this embodiment, also a portion of the second outer surface which surrounds the second portion 26 of the second outer surface 12 is covered by a portion 32B of the insulating covering. This portion 32B does not cover a triangularly shaped portion 34 of the second outer surface whereon the electrical conductor 15 is electrically conductive attached to. The latter portion is indicated with reference number 34. This means that the portions 32A and 32B of the insulating covering do in fact cover the full area of the second outer surface 12 with exception of the portion 34 of the second outer surface which in this example has a triangular shape and whereto the electrical conductor 15 is attached for example by soldering or gluing. In this example the portion 32A and 32B may be formed of one integrated piece of covering. The portions 32A and 32B in combination have a rectangular shape and as indicated, may be integral with each other. It further holds that the first electrical conductor is electrically conductive attached to the first portion of the second outer surface wherein the second outer surface is not covered by the insulating layer at a position (of triangular portion 34) where the first electrical conductor is electrically conductive attached to the second outer surface. It is noted that the embodiment as shown in FIG. 1F. may also be provided with the portions 32A, 32B of the insolating covering. This provides extra protection against influences from weather and perhaps a human hand which touches the transducer. In the example of FIG. 1F the portions 32A, 32B of the covering are however deleted.

The insulating covering may, in this example, also cover a circumferential edge area 36 of the piezoelectric ceramics element (this is the area between the edge 6 and the dotted line 35). The insulating covering and all its parts which have been discussed above is flexible and may comprise a flat tape such as a polyamide film tape. More specifically, in general it may hold that the insulating covering is flexible and is made of a flat tape such as a polyamide film tape. The tape may be attached to the metal plate by means of glue. In the present embodiment, the insolating covering does not substantially cover the circumferential edge area 36 of the piezoelectric ceramics element wherein the edges 37 of the insulating covering are adjacent to the edges 6 of the piezoelectric ceramics element and wherein optionally a sealant is provided to fill a possible gap between edges 37 of the insulating covering on the one hand and edges 6 of the piezoelectric ceramics element on the other hand.

In accordance with a special embodiment (see FIG. 1E) the transducer further comprises a metal electrode 40 which is electrically isolated from the first metal plate. In this example the metal electrode 40 and the metal plate 2 are attached to a flat rigid plate 42. This flat rigid plate 42 may be from metal if the portion of the insulating portions 32A and 32B of the insulating covering extend between the metal plate 2 and the plate 42. It is however also possible that the portions 32A and 32B from the insulating covering are deleted wherein the plate 42 is directly attached to the metal plate 2. In that case however, the plate 42 should be made from an insulation material such as a plastic. As is shown in FIG. 1E the second electrode is also attached to the plate 42 in such a way that an outer surface 44 of the metal electrode and the first outer surface 8 of the first metal plate lie at least substantially, in a same flat plane 46 as is shown in FIG. 1E (because the portion 21 of the covering 20 and the element 4 are relatively thin this means that an outer surface of the element 4 and the outer surface 44 lie at least substantially, in a same flat plane 46). The plane 46 may be formed by a surface of an object to be inspected wherein the metal electrode 40 is electrically conductive connected to the receiver and transmitter 30 by means of the second electrical conductor 33.

The metal electrode 40 is electrically conductive connected with the outer surface 22 of the object 24 as is shown in FIG. 1E. The result is again that the piezoelectric element 4 is sandwiched between the metal plate 2 on the one hand and the surface 22 on the other hand, each of which form an electrode electrically conductive connected to the piezoelectric element 4 whereby the metal plate 2 and the surface 22 are each electrically conductive connected to the receiver and transmitter 30.

Figure 2:
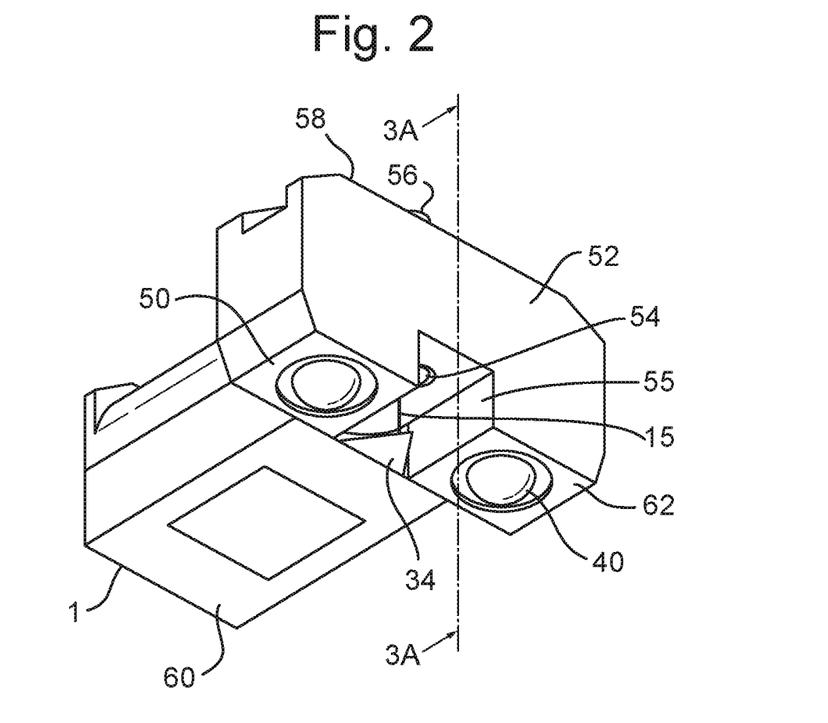
FIG. 2 shows a possible embodiment of a transducer block.

The type of transducer which has been discussed on the basis of FIG. 1A-1C can also be used in combination with a housing so as to form a transducer block. Such a transducer block is shown in FIG. 2. In FIG. 2 the transducer 1 as discussed for FIG. 1A-1C is attached to a bottom side 50 of a housing 52. The housing 52 is made from a metal. The housing 52 is provided with a bore 54 through which the electrical conductor 15 extends and which is attached to portion 34 of the second outer surface. The bore comprises a widened portion 55 near an end of the bore at the bottom side of the transducer block. At least a portion of the second outer surface which is not covered by the insulating covering (portion 34) extends over the widened portion of the bore. Thereby there is sufficient space for soldering material 37 by means of which the electrical conductor is attached to portion 34.

The block is provided with an electro connector 56 at the top side 58 of the housing. Electrical conductor 15 is electrically conductive attached (thus electrically conductive connected) near one of its free ends to this connector 56. Furthermore, the transducer block 49 is also provided with a second electrical conductor 33 such as a conductive wire which is on the one hand electrically conductive connected to the housing block and on the other hand electrically conductive connected with the connector 56. In a practical embodiment, the connector 56 is provided with a electrically conductive core 59 wherein the conductor 15 is electrically conductive connected with the conductive core. The connector may further comprise an electrically conductive cylinder 57 which is electrically conductive connected with the second conductor 33.

A second portion 62 of the bottom side of the housing which is not covered by the second outer surface of the transducer, forms an electrode.

The electrode comprises two metallic balls 40 which can be pushed inwardly into the housing against the force of springs. The spring-loaded balls form part of the bottom side of the housing within the context of this application.

At least the second portion 26 of the second outer surface of the transducer is attached to the bottom side of the housing. In this example, also the first portion 14 of the second outer surface of the transducer with the exception of the portion 34 of the second outer surface, is attached to the bottom side of the housing.

In order to provide further details about the transducer block as shown in FIG. 2 it will be demonstrated how the transducer block can be manufactured on the basis of FIG. 3A-3D.

Figure 3A:
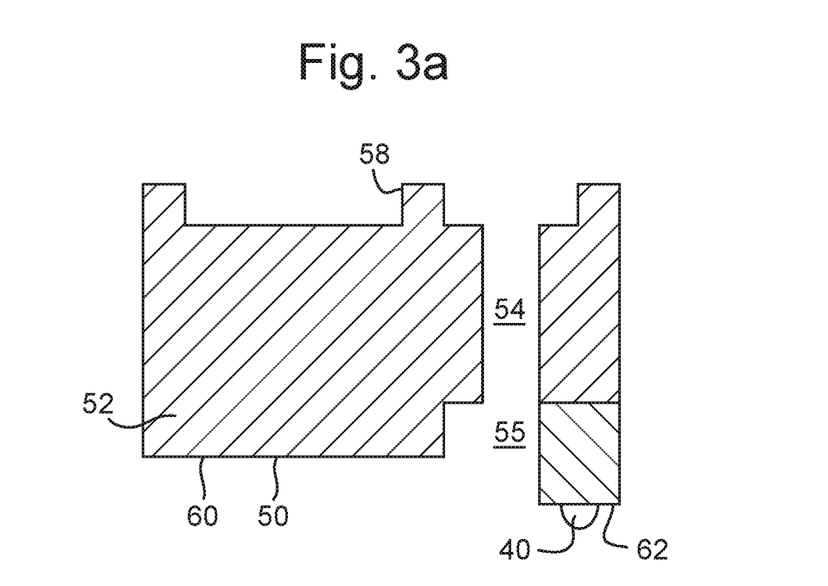
FIG. 3A shows a housing of the transducer block of FIG. 2 during a first step of a manufacturing process for the transducer block of FIG. 2.

In FIG. 3A a cross sectional view as indicated in FIG. 2 of the housing is shown. In FIG. 3A-3D parts corresponding with parts as shown in earlier figures have been provided with the same reference numbers.

Figure 3B:
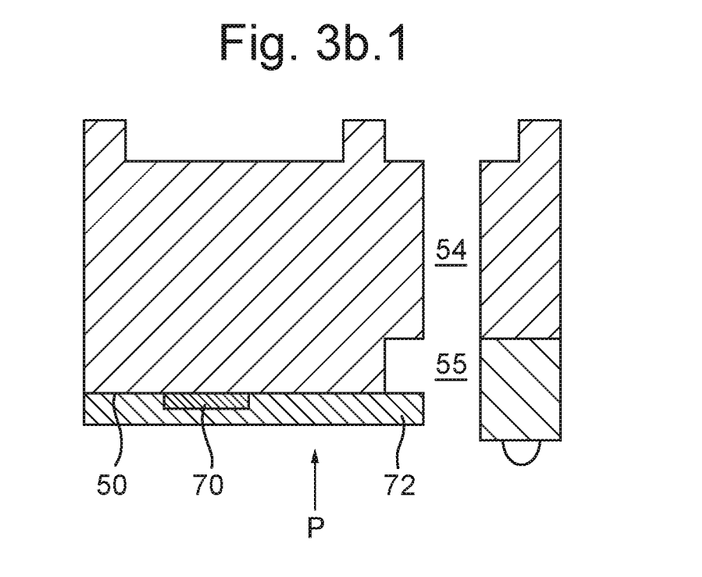
Figure 3B:
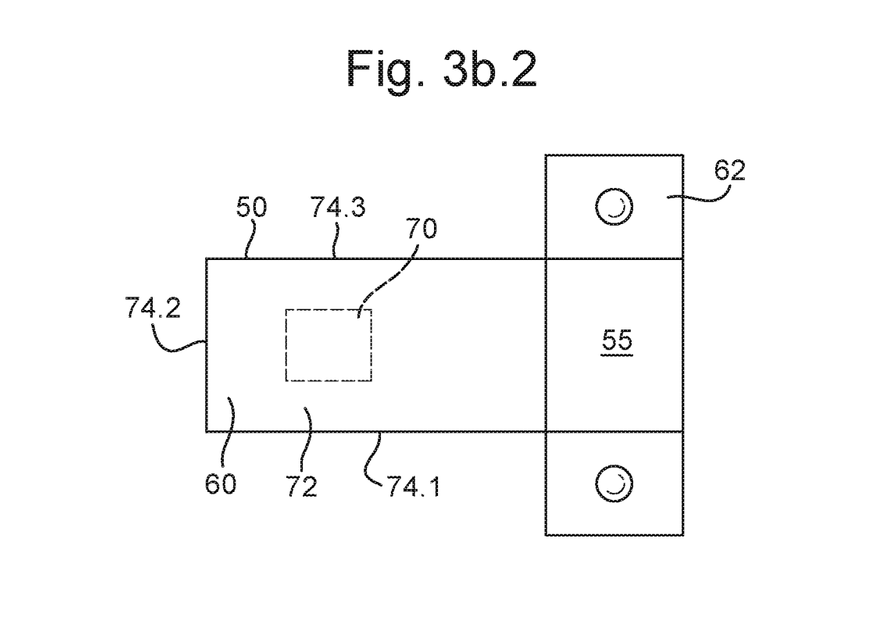

The housing 12 is made from a metal. As a first step a. in this example a rectangular plate 70 of mica material is positioned on the bottom side 50 of the housing as an acoustic barrier to reduce the transfer of ultrasonic signals into the housing. The dimensions of the plate 70 are about 12 mm×12 mm and the plate is thereby slightly larger than the dimensions of the piezoelectric element (8 mm×8 mm). The mica plate 70 is attached to the bottom side 50 by means of an insulating covering 72 in a second step (see FIG. 3B.1). A view on the housing in the direction of the arrow P in FIG. 3B.1 is shown in FIG. 3B.2.

The insulating covering 72 is in this example a polyamide adhesive film tape. The adhesive tape is attached with its adhesive side to a first portion 60 of the bottom side 50. This first portion 60 is shown in FIG. 3B.2. The insulating covering 72 covers the complete first portion 60 wherein it also covers the mica plate 70. The insulating covering 72 may also extend to side walls 74.1-74.3 of the housing and may be attached to those side walls. In the present embodiment, this is not the case.

Figure 3C:
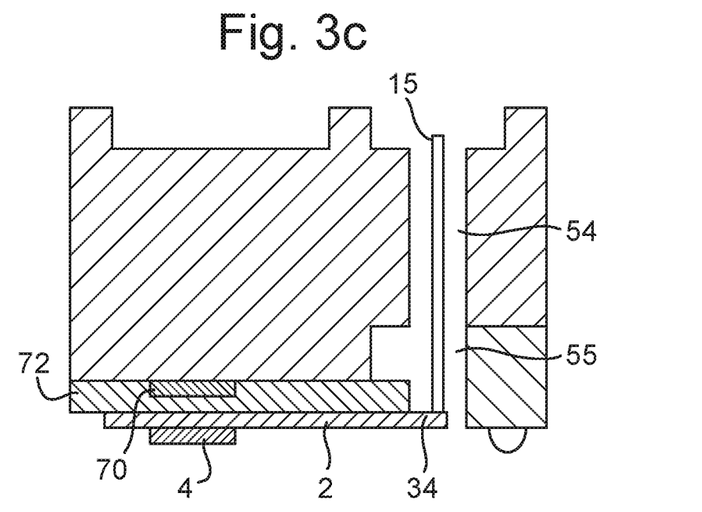
FIG. 3C shows a third step for the process for manufacturing the transducer block of FIG. 2.

In a next step the metal plate 2 whereon the piezoelectric ceramic element 4 has already been attached (thus an assembly as shown in FIG. 1D), is positioned on the insulating covering 72 as is shown in FIG. 3C. The piezoelectric ceramics element 4 and the mica plate 70 lie on opposite sides of the metal plate. The electrical conductor 15 is already electrically conductive attached to the metal plate 2 and extends through the bore 54. The portion 34 of the second outer surface is not covered by the insulating covering 72 and extends over the widened portion 55 of the bore 54. The mica plate 70 is optionally and may in all embodiments be deleted. In that case the insulating covering 72 remains for electrically isolating the housing 12 from the metal plate 2 with the piezoelectric ceramics element 4.

In a next step an insulating covering 76 is attached completely over the first outer surface 8 and the piezoelectric element 4 wherein the insulating covering 76 also extends and is folded over the side walls 74.1, 74.2, 74.3. Again, the insulating covering 76 is an adhesive tape with its gluing side attached to the first outer surface 8 and the side walls 74.1, 74.2 and 74.3. In a next step a portion of the insulating covering 76 is removed on the location where the insulating covering 76 covers the piezoelectric element 4. Thus, in this case the piezoelectric element 4 is no longer covered by the insulating covering 76 as is shown in FIG. 3D.

Figure 3D:
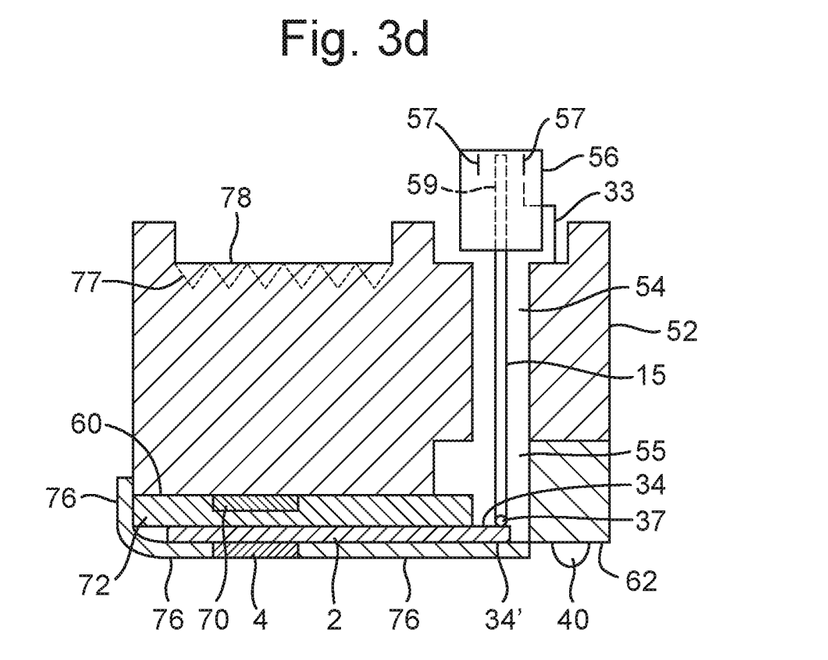
FIG. 3D shows a fourth step for the process for manufacturing the transducer block of FIG. 2.

It is also shown in FIG. 3D that the connector 56 is mounted into the housing 52 wherein a free end of the electrical conductor 15 is electrically conductive attached to (parts of) the connector. Furthermore, the housing 52 is also electrically conductive connected with the connector 56 by means of the electrical conductor 33. As is shown in FIG. 3D the housing is further provided with a recess 78 extending over a full width of the housing wherein a strip 90 such as a metal band can be accommodated in the recess for attaching the transducer block to an object such that the piezoelectric ceramics element lies directly against an outer surface of the object, in an embodiment, without an intermediate medium so that there is a dry coupling between the piezoelectric ceramic element and the surface of the object wherein the strip extends around the circumference of the object. This will be explained in more detail later by means of FIG. 5. Optionally the top side of the transducer block housing is provided with an irregular or grooved surface (shown with dotted lines 77 in FIG. 3D) to reduce internal ultrasonic reflections which could interfere with the ultrasonic measurement.

It will be clear that the insulating covering 76 corresponds with the portion 21 of the insulating covering 20 of FIG. 1A. It will also be clear that the insulating covering 72 corresponds with the portions 32A and 32B of the insulation covering as shown in FIG. 1b. It is clear that it holds for the transducer block as shown in FIG. 3D and as is also shown in FIG. 2 that at least a portion of the second outer side of the transducer is attached to a first portion 60 of the bottom side of the housing such that the first portion of the bottom side of the housing and the portion of the second outer surface of the transducer face each other. The transducer block comprises the metal electrode 20 wherein the electrode is formed by a second portion 62 of the bottom side of the housing which is not covered by the second outer surface of the transducer. It is noted that this second portion of the bottom comprises the spring-loaded balls 40 as discussed above.

It is noted that the insulating covering 76 does not substantially cover a circumferential edge area of the piezoelectric element 4 as discussed above. It is noted that in an alternative embodiment the insulating covering 76 does not substantially cover a circumferential edge area of the piezoelectric element 4. Again, optionally a sealant may be provided to fill a possible gap between edges 37 of the insulating covering on the one hand and edges 6 of the piezoelectric ceramics element on the other hand wherein the edges 37 of the insulating covering are adjacent to the edges 6 of the piezoelectric ceramics element.

Figure 3E:
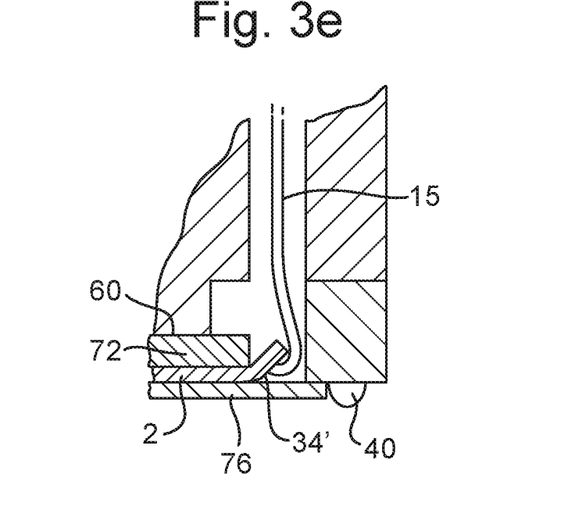
FIG. 3E shows an alternative embodiment of a transducer block.

It also holds that at least a portion of the second outer surface of the transducer which is attached to the bottom side of the housing is covered by the insulating covering in this example the insulating covering 72. It also holds that at least a portion of the second outer surface of the transducer which is not covered by the insulating covering extends partly over the widened portion 55 of the bore 54. This portion is indicated by reference number 34. In an alternative embodiment, the first electrical conductor 15 may be electrically conductive attached to a portion 34' of the first outer surface 8 which portion extends to a position above the widened portion 55 (and lays opposite portion 34). In that case the metal plate could be bent inwardly in the housing towards the widened portion 55. This alternative is shown in FIG. 3E. It further holds for the embodiment of FIG. 3E that the portion of the insulating covering 72 which covers the portion of the second outer surface 12 of the transducer is attached to and covers the first portion 60 of the bottom side of the housing wherein, as discussed, this portion of the covering possibly extends to and covers a side wall of the housing. It further holds that the first portion 60 of the bottom side of the housing and the second portion 62 of the bottom side of the housing which forms the electrode do not overlap each other and together form the bottom side of the housing.

It further holds that a portion 76 of the insulating covering which covers the first portion 10 of the first outer surface 8 extends to and covers portions of side walls 74.1-74.3 of the housing. It is noted that in the discussed embodiments the first conductor could also extend from portion 34 or 34' via a hole in the insolating covering 76 outside the housing to the connector 56. Also, alternatively the second conductor could be electrically conductive attached to an outer side of the housing (and thereby electrically conductive connected to the metal electrode) and extend from the outer side of the housing to the connector.

Figure 7:
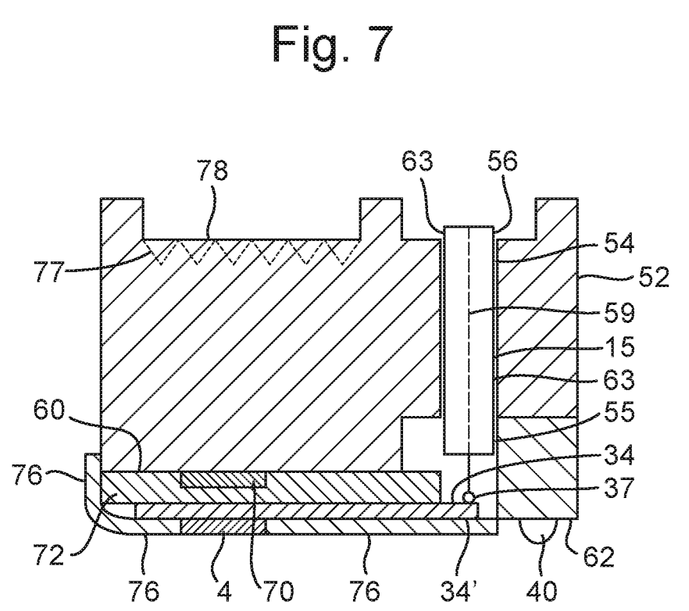
FIG. 7 shows the transducer block of FIG. 3D provided with an alternative connector.

In an alternative embodiment (see FIG. 7) the connector as a whole protrudes into the bore 54. The conductive core 59 functions as the electrical conductor 15 wherein the lower end of the conductive core 59 is directly electrically conductive connected to the portion 34. In the embodiment of FIG. 7 an outer surface 63 of the connector 56 is electrically conductive and in direct electrical conductive contact with the transducer block 49 and thereby with the balls 40 without a need for the presence of a second electrical conductor 33. In this embodiment, the outer surface 63 of the connector is electrically isolated from the inner core 59. In the embodiments discussed the conductor 56 is located on a top side of the housing. The connector can however also be located on a side of the housing.

Figure 4:
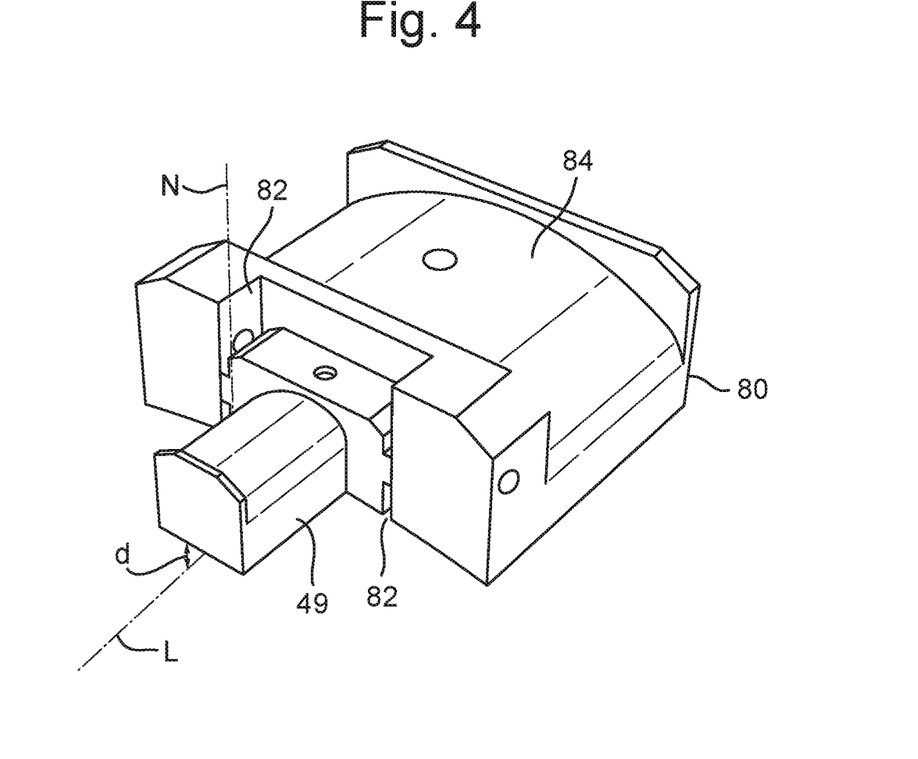
FIG. 4 shows an assembly comprising a transducer block and a positioning block.

FIG. 4 shows an assembly of a transducer block of a type discussed for FIGS. 2 and 3. The assembly further comprises a positioning block 80. The positioning block 80 is provided with a recess 82 which can accommodate a portion of the housing of the transducer block 49 so that the transducer block 49 can be moved upwardly and downwardly in a direction N perpendicular to the bottom side of the housing of the transducer block.

An outer surface of the piezoelectric ceramic element can thus be manipulated in a position such that it lies above an upper portion of the bottom surface of the positioning block. In this case, the bottom surface of the positioning block is slightly curved and the upper portion of the bottom surface lies in fact on the line L as shown in FIG. 4. The distance between the line L and the outer surface of the piezoelectric ceramics element is indicated with d in FIG. 4. The positioning block is further provided with a recess 84 extending over a full width of the positioning block at a top side of the positioning block for accommodating a strip 86.

Figure 5:
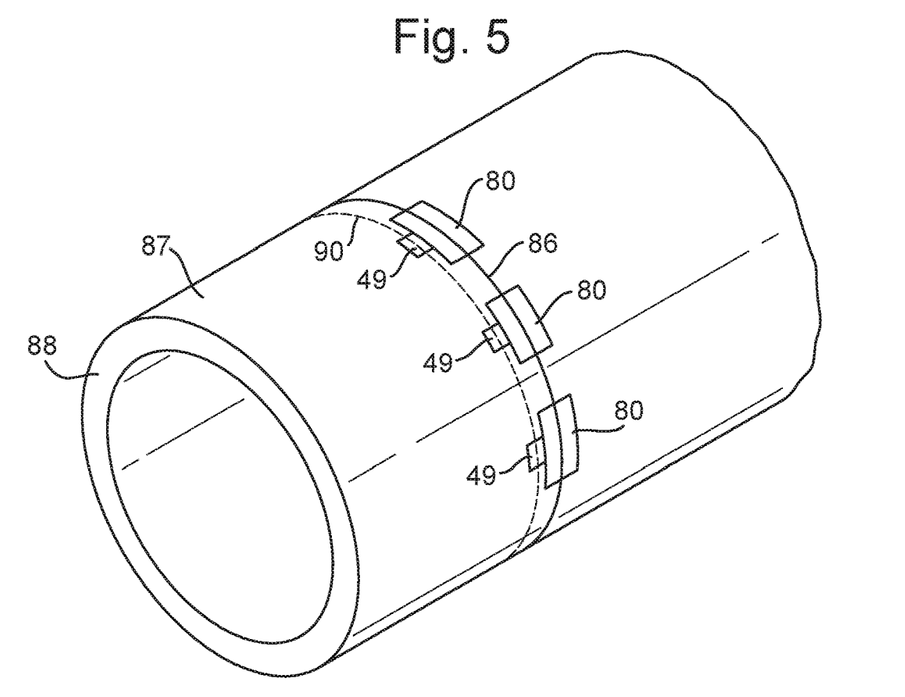
FIG. 5 shows an object in the form of a pipe whereby transducer blocks are attached to the pipe in accordance with a method using the assembly according to FIG. 4.

By means of the assembly, a plurality of transducer blocks can be attached to a surface 87 of an object 88. In this example the object 88 takes the form of a hollow pipe. A plurality of assemblies as shown in FIG. 4 are positioned on the surface 87 as shown in FIG. 5. In order to make sure that the positioning blocks hold their position, the strip 86 is positioned so that it extends around the circumference of the object 88 and lies within the recesses 84 of the positioning blocks. Thereby the positioning blocks are more or less held in place. The positioning blocks can however be slightly moved along the surface 87 of the object for positioning the transducer blocks in their desired position. While the positioning blocks 80 are moved, the piezoelectric elements of the transducer blocks lie above the surface of 22 the object without contacting the surface of the object. Thus, because the piezoelectric elements do not touch the surface 87 while moving the positioning blocks, these piezo-elements cannot be damaged. Thus, for each assembly a bottom of a positioning block of the assembly is positioned at a surface of the object wherein the positioning block of the assembly is attached to the object, wherein the positioning is in such a way that the transducer block of the assembly becomes in its desired position above the surface of the object. A bottom side of the housing of the transducer block of the assembly faces and lies against the surface of the object. After that each of the transducer blocks are in their desired position relative to the surface 87 of the object, it holds for each assembly that the transducer block is moved relative to the positioning block in a direction N and towards the surface 87 of the object 88. In this way, the first outer surface 8 of the transducers will land on the surface 87. Subsequently by means of a second strip 90 the transducer blocks are firmly attached to the surface 87 of the object 88. For this the second strip also extends around the circumference of the object and the portion of the strip which extends around the surface is shortened so that the transducer blocks are pressed against the surface 87. Once this is finished, the first strip 86 is removed and subsequently for each assembly it holds that the positioning block is moved away from the surface 87 in the direction N so that it becomes decoupled from the associated transducer block. Wirings can now be connected to each of the connectors of the transducer blocks for connecting the transducer blocks with a receiver and transmitter for submitting ultrasound into the object and receive reflections from the object by means of each transducer block.

Figure 6:
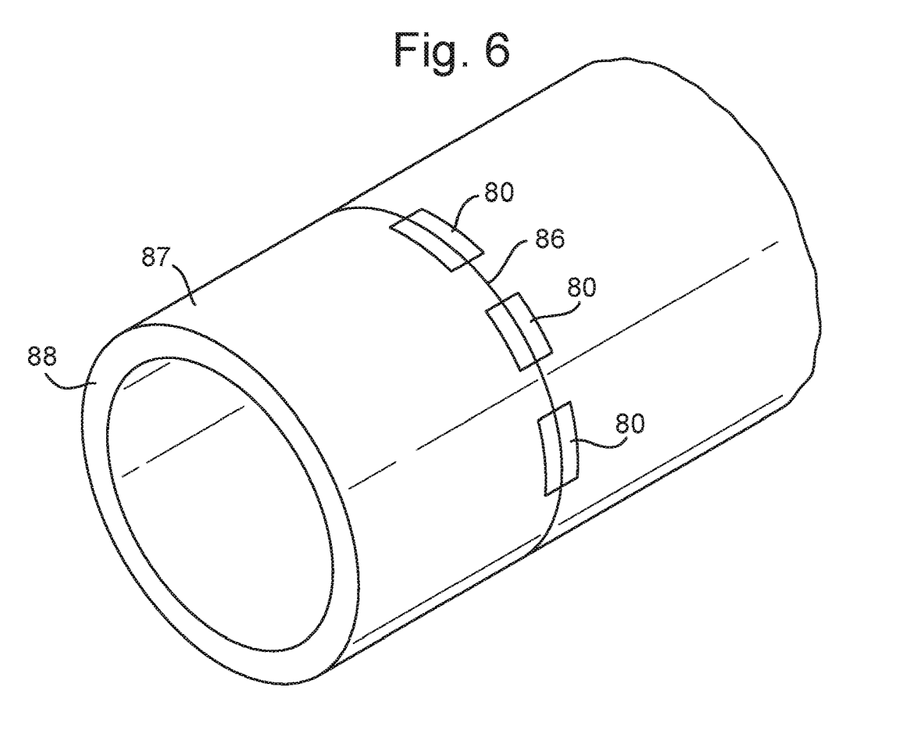
FIG. 6 shows an object in the form of a pipe whereby transducer blocks are to be attached to the pipe in accordance with an alternative method using the assembly according to FIG. 4.

By means of the positioning block the transducers can also be attached to the object in another manner. A plurality of positioning blocks 80 as shown in FIG. 4 are positioned on the surface 87 as shown in FIG. 6. In order to make sure that the positioning blocks hold their position, the strip 86 is positioned so that it extends around the circumference of the object 88 and lies within 23 the recesses 84 of the positioning blocks. Thereby the positioning blocks are more or less held in place. The positioning blocks can however be slightly moved along the surface 87 of the object for positioning the transducer blocks if they would be attached to the positioning blocks in their desired position. While the positioning blocks 80 are moved, the piezoelectric elements of the transducer blocks cannot be damaged by such movement because the transducer blocks are not connected with the positioning blocks. Thus, for each assembly a bottom of a positioning block of the assembly is positioned at a surface of the object wherein the positioning block of the assembly is attached to the object, wherein the positioning is in such a way that the transducer block of the assembly becomes in its desired position above the surface of the object if the transducer blocks would be attached to the positioning blocks. After that each of the positioning blocks are in their desired position relative to the surface 87 of the object, it holds first that the strip 86 is tightened to keep the positioning blocks temporary at the desired positions and second that for each positioning block that an transducer block is attached to the positioning block. Each positioning block 80 is provided with the recess 82 which can accommodate a portion of the housing of the transducer block 49 so that the transducer block 49 can be attached the positioning block and can be moved upwardly and downwardly in a direction N perpendicular to the bottom side of the housing of the transducer block. Thus, after attaching the transducer blocks to the positioning blocks a plurality of assemblies are obtained as shown in FIG. 5. In FIG. 5 it holds for each assembly of a transducer block and a positioning block which are attached to each other that an outer surface of the piezoelectric ceramics element is temporarily located above a bottom surface of the positioning block. Now for each assembly it holds that the transducer block is moved relative to the positioning block in a direction N and towards the surface 87 of the object 88. In this way, the first outer surface 8 of the transducers will land on the surface 87. Subsequently by 24 means of a second strip 90 the transducer blocks are firmly attached to the surface 87 of the object 88. For this the second strip also extends around the circumference of the object and the portion of the strip which extends around the surface is shortened so that the transducer blocks are pressed against the surface 87. Once this is finished, the first strip 86 is removed and subsequently for each assembly it holds that the positioning block is moved away from the surface 87 in the direction N so that it becomes decoupled from the associated transducer block. Wirings can now be connected to each of the connectors of the transducer blocks for connecting the transducer blocks with a receiver and transmitter for submitting ultrasound into the object and receive reflections from the object. It is noted that it is also possible that in step f. for each positioning block it holds that after attaching a transducer block to a positioning block, the first outer surface 8 will immediately be in contact with the surface of the object wherein the transducer block is in its desired position. This can be arranged by a snap fit connection which allows the transducer block to be connected with the positioning block by moving the transducer block sideways along the surface of the object to the positioning block wherein the snap fit connection pulls the transducer block into its desired final position. It is noted that the piezoelectric elements of the transducer blocks are dry-coupled to the surface 87. The transducer blocks are now permanently attached to the object 88 for permanently inspecting the object. Also, the transducer blocks are now permanently pressed to the surface 87 of the object 88 for permanently inspecting the object. Although there exists a dry-coupling between the piezoelectric ceramics element and the surface 87, this coupling appears to be more than sufficient for obtaining reliable test results. It may even be that the piezoelectric ceramic elements are slightly cracked but this appears to be not relevant because there is no need to move or remove the transducers now the transducers are permanently attached.

The mica plate 70 provides a somewhat flexible support of the piezoelectric 25 ceramics element 4. Thus, when the transducer block is pressed against the surface 87 the mica block 70 may be slightly squeezed, thereby providing some flexibility between the solid housing on the one hand and the piezoelectric element on the other hand so that an optimal dry coupling can be obtained.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flexible ultrasonic transducer comprising a flexible metal plate, a piezoelectric ceramics element attached on the plate, a first electrical conductor which is electrically conductive attached to the plate and an insulation covering which covers at least a portion of the metal plate, the metal plate comprising:
  a first outer surface;
  a second outer surface lying opposite to each other wherein the piezoelectric ceramics element is attached to the first outer surface wherein the dimensions of the first outer surface and the piezoelectric ceramics element are such that a first portion of the first outer surface is not covered with the piezoelectric ceramics element;
  wherein the first electrical conductor is electrically conductive attached to at least one of a first portion of the second outer surface and the first portion of the first outer surface wherein the first portion of the first outer surface and the first portion of the second outer surface lie opposite each other and have about the same dimensions and positions in a plane wherein the metal plate extends; and wherein at least a portion of the insulation covering covers the first portion of the first outer surface so that the piezoelectric ceramics element is arranged to be directly dry coupled to a surface of an object to be inspected by means of the transducer.

2. The transducer according to claim 1, wherein the insulation covering is attached to the first outer surface.

3. The transducer of claim 1, wherein the insulation covering also covers at least a second portion of the second outer surface wherein the first and second portion of the second outer surface do not overlap each other and together form the second outer surface.

4. The transducer of claim 1, wherein the first electrical conductor is electrically conductive attached to the first portion of the second outer surface, wherein the second outer surface is not covered by the insulating covering at a position wherein the first electrical conductor is electrically conductive attached to the second outer surface.

5. The transducer of claim 1, wherein the insulating covering also covers a circumferential edge area of the piezoelectric ceramics element; or wherein the insulating covering does not substantially cover a circumferential edge area of the piezoelectric ceramics element.

6. The transducer according to preceding claim 1, wherein the insulation covering is flexible and comprises a flat tape.

7. The transducer according to claim 1, wherein the transducer further comprises a metal electrode which is electrically isolated from the first metal plate wherein an outer surface of the metal electrode and the first outer surface of the first metal plate or the piezoelectric element lie at least substantially in a same flat plane.

8. The transducer according to claim 7, wherein the transducer comprises a second electrical conductor which is electrically conductive connected with the metal electrode.

9. A transducer according to claim 1, wherein the transducer is associated with a transducer block comprising a top side and a bottom side wherein at least a portion of the second outer-surface of the transducer is attached to a first portion of the bottom side of the transducer block such that the first portion of the bottom side of the transducer block and the portion of the second outer surface of the transducer face each other.

10. The transducer according to claim 9, wherein the transducer block comprises a metal electrode which is electrically isolated from the first metal plate wherein an outer surface of the metal electrode and the first outer surface of the first metal plate or the piezoelectric element lie at least substantially in a same flat plane wherein the electrode is formed by a second portion of the bottom side of the transducer block which is not covered by the second outer surface of the transducer.

11. The transducer according to claim 9, wherein at least the portion of the second outer surface of the transducer which is attached to the bottom side of the transducer block is covered by the insulation covering.

12. The transducer according to claim 9, wherein the transducer block comprises a bore extending from the top side of the transducer block towards the transducer wherein the first electrical conductor extends through the bore and wherein optionally a second electrical conductor is electrically conductive connected to the metal electrode and extends through the bore or outside the transducer block wherein optionally the second electrical conductor is electrically conductive connected to an outside of the transducer block and thereby with the metal electrode and extends outside the transducer block.

13. The transducer according to claim 12, wherein the bore comprises a widened portion near an end of the bore at the bottom side of the transducer block.

14. The transducer according to claim 13, wherein at least a portion of the second outer surface of the transducer which is not covered by the insulation covering partially extends over the widened portion of the bore.

15. The transducer according to claim 12 wherein the transducer block is provided with an electrical connector, and wherein optionally the second conductor is electrically conductive connected with the connector.

16. The transducer according to claim 11, wherein the portion of the insulating covering which covers the portion of the second outer surface of the transducer is attached to and covers the first portion of the bottom side of the transducer block.

17. The transducer of claim 10 wherein the first portion of the bottom side of the transducer block and the second portion of the bottom side of the transducer block which forms the electrode do not overlap each other and together form the bottom side of the transducer block.

18. The transducer according to claim 9, wherein a portion of the insulating covering which covers the first portion of the first outer surface of the transducer extends to and covers at least a portion of at least one sidewall of the transducer block.

19. The transducer of any preceding claim 9 wherein the top side of the transducer block is provided with a recess extending over a full width of the transducer block wherein a strip can be accommodated for attaching the transducer block to the object such that the piezoelectric ceramics element lies directly against an outer surface of the object without any intermediate medium so that there is a dry coupling between the piezoelectric ceramics element and the surface of the object wherein the strip extends around a circumference of the object.

20. The transducer of any preceding claim 9 wherein the top side of the transducer block is provided with an irregular or grooved surface to reduce internal ultrasonic reflections.

21. An assembly of a transducer block comprising:
a first outer surface;
a second outer surface lying opposite to each other wherein a piezoelectric ceramics element is attached to the first outer surface wherein the dimensions of the first outer surface and the piezoelectric ceramics element are such that a first portion of the first outer surface is not covered with the piezoelectric ceramics element;
wherein a first electrical conductor is electrically conductive attached to at least one of a first portion of the second outer surface and the first portion of the first outer surface wherein the first portion of the first outer surface and the first portion of the second outer surface lie opposite each other and have about the same dimensions and positions in a plane wherein a metal plate extends;
wherein at least a portion of an insulation covering covers the first portion of the first outer surface so that the piezoelectric ceramics element is arranged to be directly dry coupled to a surface of an object to be inspected by means of the transducer;

wherein the transducer is associated with a transducer block comprising a top side and a bottom side wherein at least a portion of the second outer surface of the transducer is attached to a first portion of the bottom side of the transducer block such that the first portion of the bottom side of the transducer block and the portion of the second outer surface of the transducer face each other; and wherein the transducer block and a position block are detachably connected to each other wherein an outer surface of the piezoelectric ceramics element lies above an upper portion of a bottom surface of the positioning block lying adjacent the transducer block and wherein the transducer block and the positioning block are movable relative to each other in a direction perpendicular to the bottom side of the transducer block.

22. The assembly according to claim 21 wherein the positioning block is provided with a recess extending over a full width of the positioning block at a top side of the positioning block for accommodating a strip.

* * * * *